United States Patent [19]

Thorn

[11] 4,279,214

[45] Jul. 21, 1981

[54] BRAKE WEAR INDICATOR

[76] Inventor: Joseph W. Thorn, 1165 W. 15th St., Escondido, Calif. 92025

[21] Appl. No.: 122,313

[22] Filed: Feb. 19, 1980

Related U.S. Application Data

[63] Continuation of Ser. No. 14,136, Feb. 22, 1979, abandoned.

[51] Int. Cl.³ .............................................. F16D 66/02
[52] U.S. Cl. ...................................... 116/208; 73/709; 188/1 A
[58] Field of Search .......................... 116/208; 73/709; 188/1 A

[56] References Cited

U.S. PATENT DOCUMENTS

| | | | |
|---|---|---|---|
| 1,388,275 | 8/1921 | Low | 73/709 |
| 1,392,587 | 10/1921 | Low | 73/709 |
| 2,117,031 | 5/1938 | Lion | 188/1 A |
| 2,924,100 | 2/1960 | Price | 73/709 |
| 3,298,446 | 1/1967 | Ayers, Jr. et al. | 116/208 X |
| 3,779,080 | 12/1973 | Smith | 73/309 |

Primary Examiner—Daniel M. Yasich
Attorney, Agent, or Firm—Fulwider, Patton, Rieber, Lee & Utecht

[57] ABSTRACT

There is disclosed a brake wear indicator which is suited for the retrofit installation on vehicle pneumatic brakes. The wear indicator comprises a sleeve that loosely fits over the push rod of the pneumatic actuator. The sleeve has an outside diameter permitting it to be received in the aperture of the actuator housing which slidably receives the push rod and is frictionally engaged within this aperture. When the vehicle brakes are applied during normal operation, the sleeve is extended from the actuator by the diaphragm member assembly which subdivides the actuator housing into the air pressure chamber and the ambient chamber which receives the push rod. Indicia are calibrated on the exterior surface of the sleeve whereby one can directly observe the degree of sleeve travel which corresponds to the push rod travel in the brake system. A continuous reading is thus obtainable on the degree of wear of the brake system.

10 Claims, 12 Drawing Figures

BRAKE WEAR INDICATOR

This is a continuation of application Ser. No. 014,136, filed Feb. 22, 1979 now abandoned.

BACKGROUND OF THE INVENTION

1. Field of Invention

This invention relates to improvements in a brake system and in particular to a brake wear indicator useful in a vehicle pneumatic brake system.

2. Brief Statement of the Prior Art

The brakes which are commonly used on vehicles, particularly trucks and trailers, are air pressure actuated. These commonly have a brake actuator which comprises an air pressure chamber and flexible diaphragm that is mechanically linked to the brake by a push rod or other mechanical linkage having a travel which increases as the brake member, such as a brake pad or brake lining, wears during use. In the typical pneumatic brakes on trucks and trailers, the actuator is visible and the common practice for determining the magnitude of the wear is to observe the degree of travel of the actuator rod. This can be accomplished by marking the rod in its most retracted position within the actuator (brakes off), having a companion apply the brakes, and measuring the length of the push rod extension. Alternatively, one can forcibly extend the actuator against the bias of the return spring of the actuator assembly. Most vehicle codes provide a safe or permissible limit to the magnitude of travel of the actuator rod which commonly is from one to about two inches.

The current brake systems are, accordingly, difficult to inspect and require a companion or special equipment for determining the degree of travel of the brake actuator push rod. This inspection is made by vehicle operators, mechanics and inspection officials, however, it is not made as routinely or frequently as should be, owing to the difficulty of such inspection, ultimately presenting a significant potential for hazardous condition of vehicles.

BRIEF STATEMENT OF THE INVENTION

This invention comprises a brake wear indicator which can be installed on the brake actuator push rod to coact with the brake actuator and provide a continuous indication of the degree of actuator travel, thus providing a continuous indication of the degree of wear of the brake member. The invention comprises a sleeve that is axially and loosely received over the actuator push rod and that has an internal diameter permitting it to be received in the aperture of the actuator housing which slidably receives the actuator push rod. The outside diameter of the sleeve is sufficient to provide frictional engagement with the actuator housing whereby the sleeve will remain at its extended position reached during the application of the vehicle's brakes. One can readily inspect the degree of wear of the brakes of a vehicle equipped with the invention simply by observing the degree of extension of the cylinder of the invention from the actuator housing.

BRIEF DESCRIPTION OF THE DRAWINGS

The invention will be described with reference to the figures of which.

DESCRIPTION OF PREFERRED EMBODIMENTS

Figure 1:
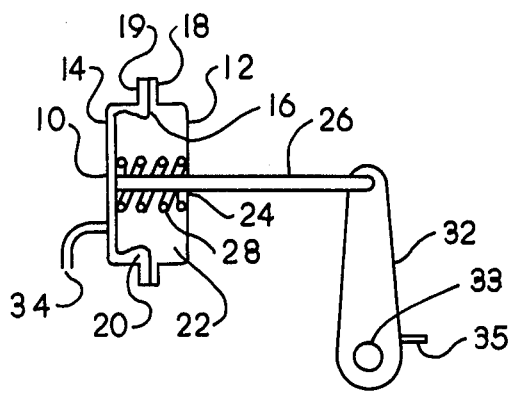
FIGS. 1 and 2 illustrate a pneumatic brake actuator.

Referring now to FIG. 1, there is illustrated a typical pneumatic brake actuator and push rod assembly. As there illustrated, the brake actuator comprises a housing 10 formed of first and second halves 12 and 14. The housing is subdivided by a flexible diaphragm subassembly 16 which is peripherally secured by the opposed, mating flanges 18 and 19 of the halves 12 and 14 of the housing. The flexible diaphragm subdivides the interior of the housing 10 into a pressure chamber 20 and an ambient chamber 22, the latter having a central aperture 24 that slidably receives the push rod 26. The ambient chamber also typically contains resilient means such as the helical compression spring 28 which can be coaxially received by the push rod. The resilient spring 28 biases the flexible diaphragm assembly 16 into its returned position as shown in FIG. 1. The push rod 26 extends to mechanical coupling to the brake on the wheel or shaft of the vehicle, commonly to a bell crank 32. The crank 32 is commonly referred to as a slack adjuster since it is coupled to shaft 33 by an adjustment bolt 35 which typically has a worm gear end that engages gear teeth on shaft 33 whereby the angular position of crank 32 on shaft 33 is fixedly adjustable. The pressure chamber 20 of the housing 10 has a supply port 34 communicating therewith which is connected through flexible tubing and the like to the pneumatic system, commonly through a treadle valve or other valve mechanism responsive to the brake pedal movement.

Figure 2:
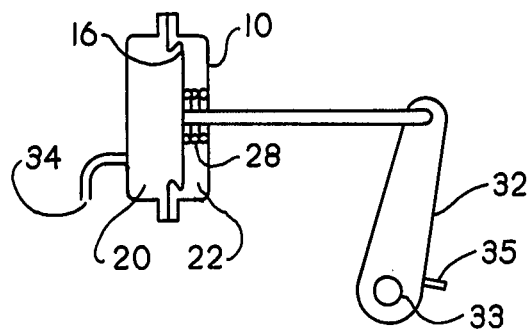

Referring now to FIG. 2, the typical pneumatic brake system thus described is shown in the brake "on" position. As there illustrated, the flexible diaphragm assembly 16 has moved, under the force of the air pressure admitted to chamber 20 of the housing, compressing the helical coil spring 28 and advancing the push rod to rotate slack adjuster 32 and apply the brake. The extent of this travel is limited by the seating of the brake member such as a brake lining or brake pad against the wheel member such as a disc or drum attached to the vehicle wheel. The extent of the travel of the push rod thus provides a direct indication of the degree of wear of the brake member as well as any accumulated tolerances in the mechanical interconnection of the actuator to the brake member. This travel thus indicates the wear of the entire brake system and, for this reason, is used in vehicle code specifications on the permissible safe and unsafe condition of the brake system.

In most brake actuators, the push rod is loosely received through a substantially larger diameter aperture of the housing since the push rod communicates with the ambient pressure chamber 22 of the housing 10. This construction is thus readily retrofitted with my invention that is illustrated in FIGS. 3 and 4.

Figure 3:
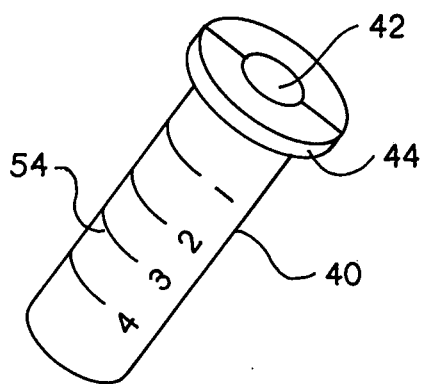
FIG. 3 is a perspective view of the sleeve member of the invention.

Referring now to FIG. 3, my invention comprises an indicating means or sleeve member 40 having an internal, longitudinal through bore 42 of a diameter that will loosely fit over the push rod 26. The external diameter of sleeve 40 is sufficient to be received within aperture 24 in the wall of housing 10 and is frictionally engaged therewith. The sleeve member preferably has a distal peripheral rim 44 which serves as a means of manually returning the device to its original position after the excess travel, or slack, has been corrected by the slack adjuster.

Figure 4:
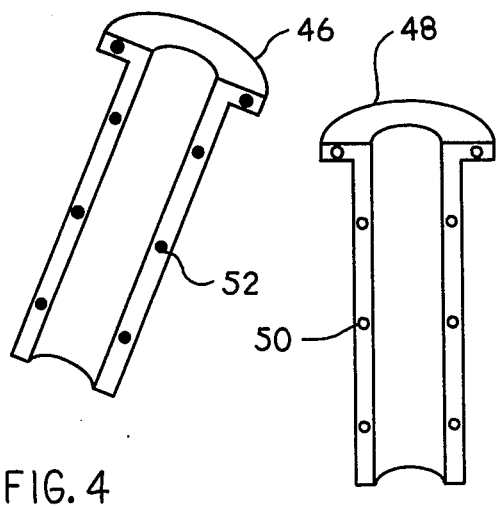
FIG. 4 is a perspective view of the preferred sleeve member in its disassembled position.

In a preferred embodiment shown in FIG. 4, the sleeve member 40 is formed of longitudinally split halves 46 and 48. The split halves bear coacting interengaging fastener means such as the pegs 50 and coacting, opposing apertures 52 to interlock the split halves 46 and 48 when the latter are placed about the actuator rod 26.

Preferably, the sleeve member 40 bears, on its external surface, indicia 54 (shown in FIG. 3) which are useful in registering the degree of travel of the push rod. The indicia can comprise a series of numerals in calibrated progression from the rim 44 or, optionally, can comprise a color code progressing from green for "safe," through yellow to red, the latter indicating an "unsafe" brake condition.

Figure 5:
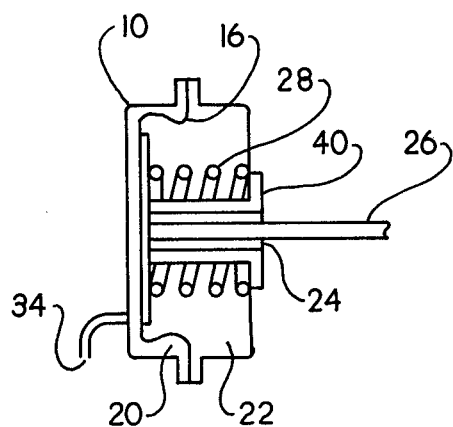
FIG. 5 illustrates the sleeve member of the invention as initially installed on a brake actuator.

Referring now to FIG. 5, the sleeve member 40 of the invention is shown as initially installed on a brake actuator 10. The sleeve member is placed about the actuator push rod 26 and is fully retracted within aperture 24 of the housing 10 extending to an abutment against the ambient pressure side of the flexible diaphragm assembly 16.

Figure 6:
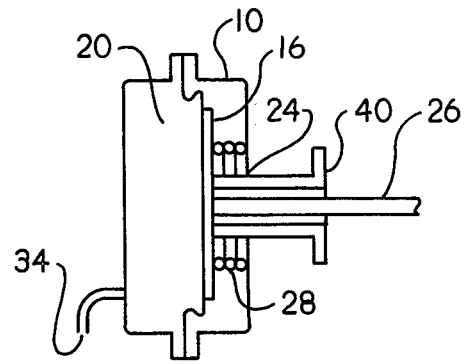
FIG. 6 illustrates the brake actuator of FIG. 5 in a braking application.

When the vehicle brakes are applied, the flexible diaphragm assembly 16 moves to the position shown in FIG. 6, forcefully extending the sleeve member 40 the full distance of the travel of the actuator push rod 26.

Figure 7:
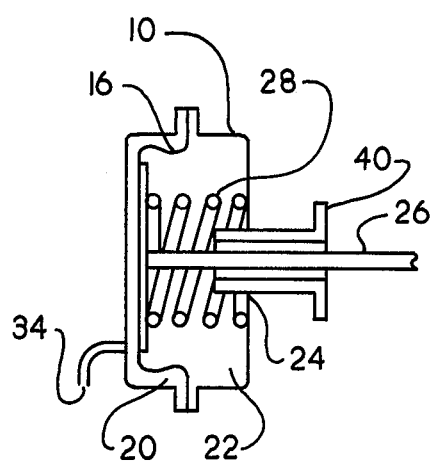
FIG. 7 illustrates the brake system of FIG. 6 after the brakes are released.

When the brakes are released, the helical spring 28 restores the flexible diaphragm assembly 16 to its relaxed position, retracting the actuator push rod 26 into the actuator. Since the sleeve member 40 of the invention is frictionally received in aperture 24 of housing 10 and only loosely received about the actuator push rod 26, the movement of the latter into the housing 10 does not disturb the position of the sleeve member 40. Accordingly, the sleeve member 40 remains at its extended position as is shown in FIG. 7. The extent of travel of the actuator push rod 26 can then be simply and directly observed by one without any disassembly of the brake system or without requiring a companion to apply the brakes of the vehicle.

Figure 8:
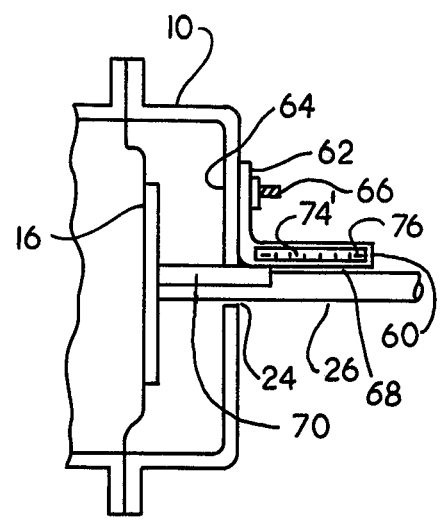
FIG. 8 illustrates an alternative embodiment of the invention.

Referring now to FIG. 8, an alternative embodiment of the invention is illustrated. This embodiment of the invention is intended for universal application to brake actuators which have a variety of push rod and housing aperture diameters. As there illustrated, the indicator comprises a mounting block member 60 which is adapted for mounting on the external wall of the actuator housing 10 by suitable means such as the existing threaded mounting stud of housing 10 in close proximity to aperture 24. To this end, the block has a mounting flange 62 which is bored at 64 to receive the existing threaded mounting stud 66. The block 60 has a longitudinal groove 68 that slidably receives, in a frictional fit, a wear indicator member 70. The wear indicator member projects into the housing 10 through aperture 24.

Preferably, the indicator member 70 is circular to fit about the actuator push rod 26 or has a partial circular cross section to provide a concave cylindrical surface that fits over the actuator push rod 26. The block 60 also preferably has an adjustable and calibrated scale 74' which is fixedly adjustable longitudinally on the block 60. For this purpose, an adjustment or fastening screw or pair of screws 76 can be employed which are received within a longitudinal slot of the scale whereby the latter can be longitudinally adjusted on the block member 60 and set to register with its zero index at the junction of the exterior wall of housing 10 when the actuator and push rod are in the most retracted, brake "off" position.

Figure 9:
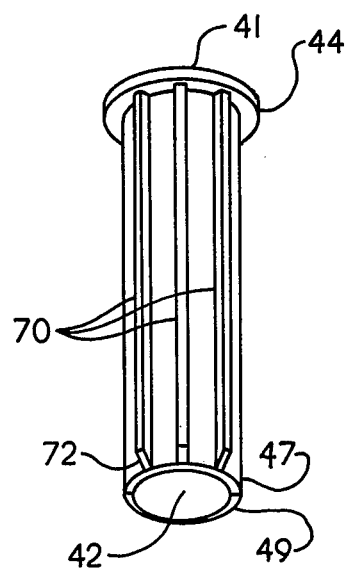
FIG. 9 illustrates an alternative embodiment of the sleeve member.

FIG. 9 illustrates a preferred embodiment of the brake wear indicator shown in FIGS. 1–7. In this embodiment, the split halves 47 and 49 are provided with one or more longitudinal ribs 70, to enhance the frictional engagement of the assembled sleeve member 41. Preferably, the distal portions of ribs 70 are bevelled at 72 to facilitate insertion of the sleeve member 41 into aperture 24 of the brake actuator housing 10.

Figure 10:
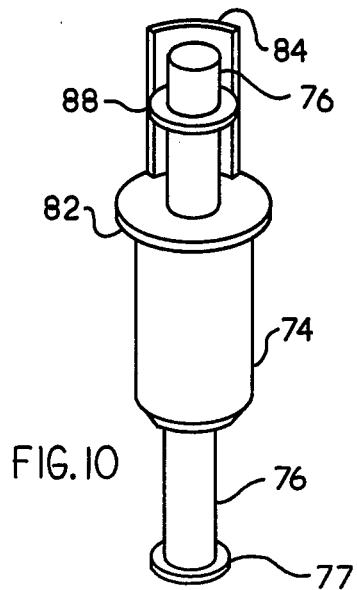
FIGS. 10–12 illustrate another embodiment of the invention.
Figure 11:
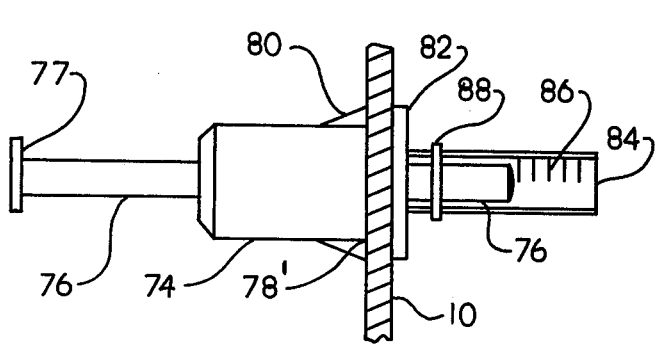
Figure 12:
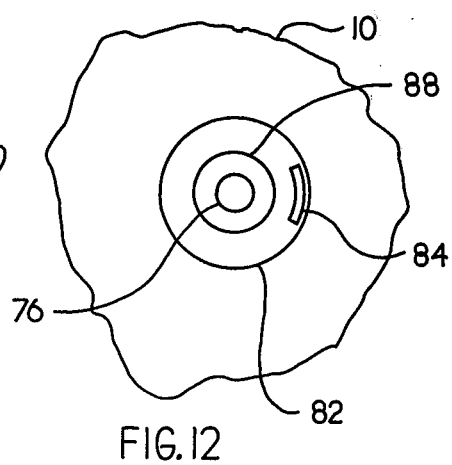

Another embodiment is shown in FIGS. 10–12. This embodiment has a mount on sleeve 74 which slidably receives rod 76 in a frictional fit. The sleeve 74 is inserted into a small diameter aperture 78' that is bored into housing 10. One or more, wedge-shaped rib members 80 are spaced about the outer wall of sleeve 74 and cooperate with flange 82 to capture the wall of housing 10, firmly securing the sleeve 74 to the housing.

Flange 82 supports an upright bracket 84 which bears indicia 86 which can be a plurality of calibrated lines. A disc 88 is slidably mounted on rod 76 with a friction fit to prevent free movement of the disc.

In operation, the sleeve is seated in an aperture bored in the wall of housing 10 and rod 76 is retracted to seat the end of rod 76, and its dependent circular foot 77 against diaphragm 16. Disc 88 is pushed along rod 76 until it rests against the outside face of the housing wall. When the vehicle brake is applied, the diaphragm extends rod 76 which remains in its most extended travel because of the frictional fit of rod 76 by sleeve 74 when the brake is released. The disc 88 cooperates with indicia 86 to register the degree of travel of the rod (distance x) and thus reflect the slack in the brake system.

The invention has been described with reference to the illustrated and presently preferred embodiments. It is not intended that the invention be unduly restricted by this disclosure of preferred embodiments. Instead, it is intended that the invention be defined by the means, and their obvious equivalents, set forth in the following claims.

What is claimed is:

1. In a fluid actuated vehicle brake system having a brake actuator housing divided by a diaphragm means into ambient and pressure fluid chambers, and further having resilient means biasing said diaphragm means to a brake-off position, an improved brake wear indicator comprising:

indicator means comprising a sleeve disposed through an aperture in said housing and further comprising an elongated indicator element in engagement with said diaphragm means and extending out of said aperture, said indicator element being displaceable responsive to a displacement of said diaphragm, said sleeve being constrained against movement relative to the margins defining said aperture, said indicator element being constrained against free movement relative to said sleeve whereby displacement of said diaphragm means to a brake-on position effects extension of said indicator element farther out of said housing, and whereby said indicator element is frictionally constrained against unassisted movement inwardly of said sleeve after said diaphragm means returns to its brake-off position, said indicator means having indicia located externally of said housing for determining the amount of said extension of said indicator element responsive to said displacement of said diaphragm, said indicator means having a registration element movable to a zero index position for establishing a zero index position of said index element.

2. In a fluid actuated vehicle brake system having a brake actuator housing divided by a diaphragm means into ambient and pressure fluid chambers and further having resilient means biasing said diaphragm means to a brake-off position and an actuator push rod mechanically linked to said diaphragm means, an improved brake wear indicator comprising:

an elongated indicator element axially received in an aperture in said housing with its inner end in unattached abutment with said diaphragm means and projecting externally of said housing whereby displacement of said diaphragm means and actuator push rod to a pressured, brakeon position responsively displaces said indicator element from said housing, said indicator element further having friction means cooperative with the margins defining said housing aperture to develop a frictional constraint against free movement of said indicator element relative to said margins whereby displacement of said diaphragm means to a brake-on position extends said indicator element farther out of said housing, and whereby said indicator element remains in its extended position after said diaphragm means returns to its brake-off position;

indicia located externally of said housing for determining the amount of displacement of said indicator element responsive to said displacement of said diaphragm; and, a registration element movable to a zero index position for establishing a zero index position of said index element.

3. The system of claim 2 wherein said indicator element comprises a sleeve member loosely receiving said push rod, and wherein said friction means comprises the outer portion of said indicator element engaged against said margins defining said housing aperture.

4. The system of claim 3 wherein said sleeve member comprises an assembly of longitudinally split halves of a cylindrical sleeve to permit assembly of said split halves about said push rod for insertion of said cylindrical sleeve into said housing aperture without disturbing said push rod.

5. The system of claim 4 wherein said split halves include confronting, interengaging fastener means preventing relative longitudinal movement therebetween.

6. The system of claim 3 wherein said sleeve member includes an outer flange presenting an exterior surface which may be pressed inwardly to locate said inner end in abutment with said diaphragm.

7. The system of claim 3 wherein said sleeve member and said housing bear cooperative indicia to establish the extent of extension of said sleeve member from said housing.

8. In a fluid actuated vehicle brake system having a brake actuator housing divided by a diaphragm means into ambient and pressure fluid chambers and further having resilient means biasing said diaphragm means to a brake-off position, an improved brake wear indicator comprising:

a mount disposed through an aperture in said housing;

an elongated indicator element in engagement with said diaphragm means and projecting through and externally of said mount, said indicator element being frictionally constrained by said mount against free movement of said indicator element relative to said mount whereby displacement of said diaphragm means to a brake-on position effects extension of said indicator element farther out of said mount against such frictional constraint, and whereby frictional constraint prevents unassisted movement of said indicator element inwardly of said mount after said diaphragm means returns to its brake-off position indicia located externally of said housing for determining the amount of said extension of said indicator element responsive to said displacement of said diaphragm; and, a registration element movable to a zero index position for establishing a zero index position of said index element.

9. The system of claim 8 wherein said indicator element and said mount bear cooperative indicia to establish the extent of projection of said indicator element from said mount.

10. The system of claim 9 wherein said indicia on said indicator element comprises a member frictionally longitudinally moveable upon said indicator element.

* * * * *